US008660495B2

(12) United States Patent
Liu

(10) Patent No.: US 8,660,495 B2
(45) Date of Patent: Feb. 25, 2014

(54) ACCESSORY DISPLAY SYSTEM

(75) Inventor: Eric Liu, Santa Clara, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 159 days.

(21) Appl. No.: 13/176,534

(22) Filed: Jul. 5, 2011

(65) Prior Publication Data
US 2013/0012133 A1 Jan. 10, 2013

(51) Int. Cl.
H04B 7/00 (2006.01)
H04B 5/00 (2006.01)

(52) U.S. Cl.
USPC .......... 455/41.3; 455/41.1; 455/41.2

(58) Field of Classification Search
USPC .......... 455/41.2, 41.03, 566, 573, 3.01; 345/2.3, 581
See application file for complete search history.

(56) References Cited

U.S. PATENT DOCUMENTS

| 7,061,449 B2 * | 6/2006 | Oya et al. ............. 345/2.3 |
| 7,715,873 B1 | 5/2010 | Biere et al. |
| 8,280,453 B2 * | 10/2012 | Beart et al. ............. 455/572 |
| 8,326,373 B2 * | 12/2012 | Song et al. ............. 455/574 |
| 8,526,882 B2 * | 9/2013 | Ye et al. ............. 455/41.2 |
| 2006/0061546 A1 | 3/2006 | Jong |
| 2012/0181855 A1 * | 7/2012 | Hunt et al. ............. 307/9.1 |
| 2012/0316414 A1 * | 12/2012 | Greene ............. 600/365 |
| 2013/0122890 A1 * | 5/2013 | Ito et al. ............. 455/422.1 |

OTHER PUBLICATIONS

Admin; "NYX Display Jacket"; http://www.crunchwear.com/nyx-display-jacket/, Apr. 27, 2007.
Hanlon, Michael, "Motorola and Burton Snowboards Launch Second Generation of Audex Wearable Electronics"; 2009.
Iso-Ketola, P. et al.; "A Mobile Device as User Interface for Wearable Applications"; Tampere University of Technology; 5 pages, 2005.

* cited by examiner

Primary Examiner — Andrew Wendell
Assistant Examiner — Maryam Soltanzadeh
(74) Attorney, Agent, or Firm — Romiwa C. Akpala

(57) ABSTRACT

Embodiments of the present invention disclose an accessory display system. According to one embodiment, the system includes an external accessory display and a portable electronic device. Furthermore, the portable electronic device is configured to power and transmit data to said display for remote viewing by an operating user.

19 Claims, 5 Drawing Sheets

ACCESSORY DISPLAY SYSTEM

BACKGROUND

The emergence and popularity of mobile computing has made portable electronic devices, due to theft compact design and light weight, a staple in today's marketplace. In order to remain continuously connected, personal mobile devices are seemingly omnipresent and often accompany a user at all times and at all places. In most cases, personal mobile devices are transported within a pocket or carrying case (e.g., purse, backpack) during transit. Whenever an incoming message or call is received, the operating user typically must remove the mobile device from its carrying position (e.g., pocket or purse) in order to view the new message. Such action can be distracting and/or physically cumbersome to the point that the user is unable to answer the call in time or fails to read a time-sensitive message.

BRIEF DESCRIPTION OF THE DRAWINGS

The features and advantages of the inventions as well as additional features and advantages thereof will be more clearly understood hereinafter as a result of a detailed description of particular embodiments of the invention when taken in conjunction with the following drawings in which.

DETAILED DESCRIPTION OF THE INVENTION

Figure 1:
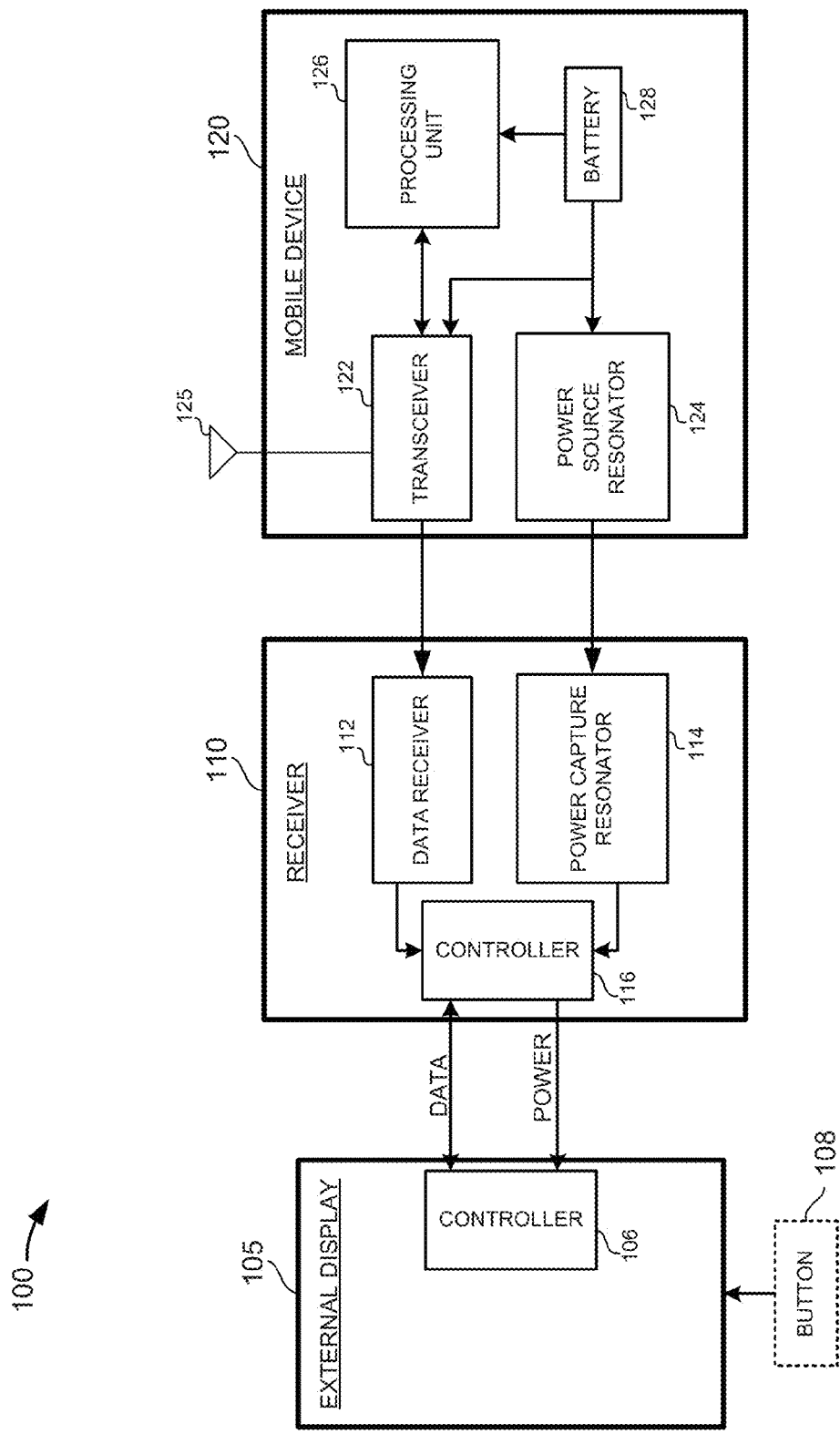
FIG. 1 is a simplified block diagram of the accessory display system according to an example of the present invention.

The following discussion is directed to various embodiments. Although one or more of these embodiments may be discussed in detail, the embodiments disclosed should not be interpreted, or otherwise used, as limiting the scope of the disclosure, including the claims. In addition, one skilled in the art will understand that the following description has broad application, and the discussion of any embodiment is meant only to be an example of that embodiment, and not intended to intimate that the scope of the disclosure, including the claims, is limited to that embodiment. Furthermore, as used herein, the designators "A", "B" and "N" particularly with respect to the reference numerals in the drawings, indicate that a number of the particular feature so designated can be included with examples of the present disclosure. The designators can represent the same or different numbers of the particular features.

The figures herein follow a numbering convention in which the first digit or digits correspond to the drawing figure number and the remaining digits identify an element or component in the drawing. Similar elements or components between different figures may be identified by the user of similar digits. For example, 143 may reference element "43" in FIG. 1, and a similar element may be referenced as 243 in FIG. 2. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

One solution to the aforementioned problem is a docking station for the mobile device. In this configuration, a personal mobile device such as a phone is docked into a separate device such as a vehicle or speaker system for example, so that data from the phone is output via the attached device (e.g., audio broadcast through vehicle audio system or external speaker system). However, these docking stations are only useful in location-specific areas (i.e., living room, car) and not conducive for mobile or other environments such as at a meeting, a restaurant, or while the user is walking or running, in which cases the phone is generally transported in a pocket, purse, or backpack. Other solutions exist where a Bluetooth® headset or a wristwatch display is used for communicating information from the mobile device to the operating user. In both scenarios, the phone may remain in the pocket or carrying case of the user while data is wirelessly transmitted to the headset or watch. However, both the headset and watch require a separate battery which must be constantly charged thus limiting its effectiveness and reliability during prolonged use of the mobile device.

Example embodiments of the present invention disclose an accessory display system using a mobile device. According to one example, the system includes an external accessory display coupled with a receiver unit. Moreover, the receiver unit of the accessory display system is inductively powered via the mobile device once the mobile device is placed within proximity to the receiver unit. In turn, the receiver unit transmits power and data to the external display for remote viewing by the operating user. That is, the system configuration of the present examples allows for coupling of a mobile device with an external display that has no battery and minimal electronic components thus permitting viewing of information associated with the mobile device remotely (i.e., separately from the display of mobile device).

Referring now in more detail to the drawings in which like numerals identify corresponding parts throughout the views, FIG. 1 is a simplified block diagram of the accessory display system according to an example of the present invention. As shown here, the system 100 includes an external accessory display 105, a receiver 110, and a mobile device 120. According to one example, mobile device 120 represents a smartphone device and includes a transceiver 122, battery unit 128, power source resonator 124, and processing unit 126. The transceiver 122 is configured to receive data from the processing unit or communication tower via the wireless antenna 125 and send data to the receiver 110. Moreover, battery unit 128 represents a rechargeable power supply for powering the internal electrical components housed within the mobile device 120. Processing unit 126 represents a central processing unit (CPU), microcontroller, microprocessor, or logic configured to execute programming instructions associated the mobile device 120 and display system 100. According to one example, the mobile device 120 supplies power to the receiver 110 through inductive charging, which involves the use of an electromagnetic field to transfer energy between objects, or any other short distance wireless energy transfer means. That is, the power source resonator 124 of the mobile device 120 transmits power electromagnetically to the power capture resonator 114 of the receiver 110. In one example, power source resonator 124 and power capture resonator 112 represent induction coils (primary and secondary) configured to generate an alternating electromagnetic field when in close proximity with each other so as to form an electrical transformer and provide power to the receiver 110.

Furthermore, receiver 110 represents an inductive powering device such as an HP® Touchstone charging dock configured to receive power and data wirelessly from mobile device 120 and send power and data to the external display 105. More particularly, receiver 110 includes a data receiver 112 for receiving data from the mobile device and a power capture resonator for receiving power from the mobile device 120. Still further, controller 116 of the receiver 110 is configured to transmit data and power to controller 106 of the external display 105. According to one example, the external assessor display 105 is a flexible low power and battery-less display capable of being integrated into a jacket or carrying bag such as a backpack or a purse. For instance, the external display 105 may be a bistable display such as an electronic ink display or similar display able to maintain a display image without drawing power. However, a liquid crystal display (LCD) or organic light emitting diode (OLED) display may also be used as the external display 105. According to an example embodiment, external display 105 may be powered by the receiver 110 conductively (i.e. wired or direct electrical connection) or inductively (i.e. wireless). Optionally, an input button may be provided next to and in connection with the external display 105 for facilitating user input with the mobile device 120.

Figure 2:
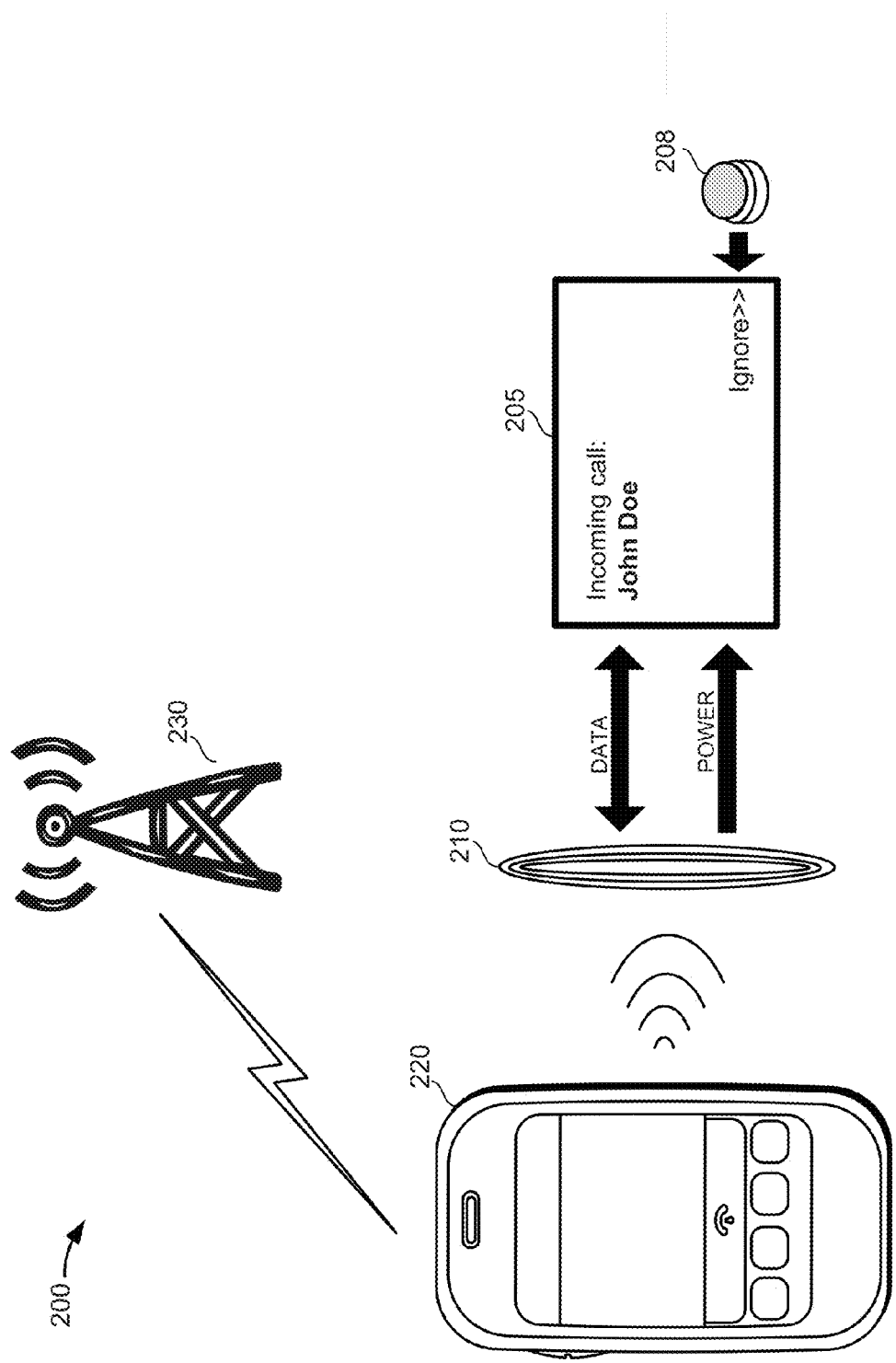
FIG. 2 is a simplified graphical illustration of the accessory display system according to an example of the present invention.

FIG. 2 is a simplified graphical illustration of accessory display system according to an example of the present invention. As shown here, the accessory display system 200 includes a mobile device 220 in communication with a cell phone or radio tower 230. Upon receiving a message or initiating event, the mobile device 220 sends power and data wirelessly to the receiver unit 210. Power and data is then transmitted from the receiver unit 210 to the external display 205 to enable external viewing by the operating user. In the present example, the receiver 210 powers the external display 220 and sends data relating to an incoming call received at the mobile device 210. The power and the data relating to the incoming call is then transmitted to the external display 220 via the receiving unit 210. As mentioned above, in addition to a wired connection, the receiver unit 210 may use wireless powering and transmitting means for communicating with the external display 205. Similarly, data may also be wirelessly transmitted between the mobile device 220 and external display 205 via Bluetooth, Wi-Fi, or any other similar short-range wireless communication technology. Moreover, in an effort to save power, the external display 205 would only need to draw power from the mobile device 220 and receiver 205 whenever a message or status update is received at the mobile device 220. Additionally, the external display 205 could use on-cell memory to maintain its state using very low or no power. Since the external display lacks a battery or internal power source, it can be formed to be flexible and water-resistant thus making it ideal for placement within a garment or carrying bag. When coupled with the mobile device 120, the external display 105 allows for remote viewing (i.e., viewing separately from display of mobile device) of incoming alerts such as text messages, emails, phone calls, weather, time, and the like without the user having to remove the mobile device from their pocket or purse. Furthermore, a button or other input device 208 may be integrated near the external display 220 for allowing quick feedback back to the mobile device 220. For example, the button 208 may be utilized to ignore a call, dismiss a message, request an update to status information, or the like.

Figure 3:
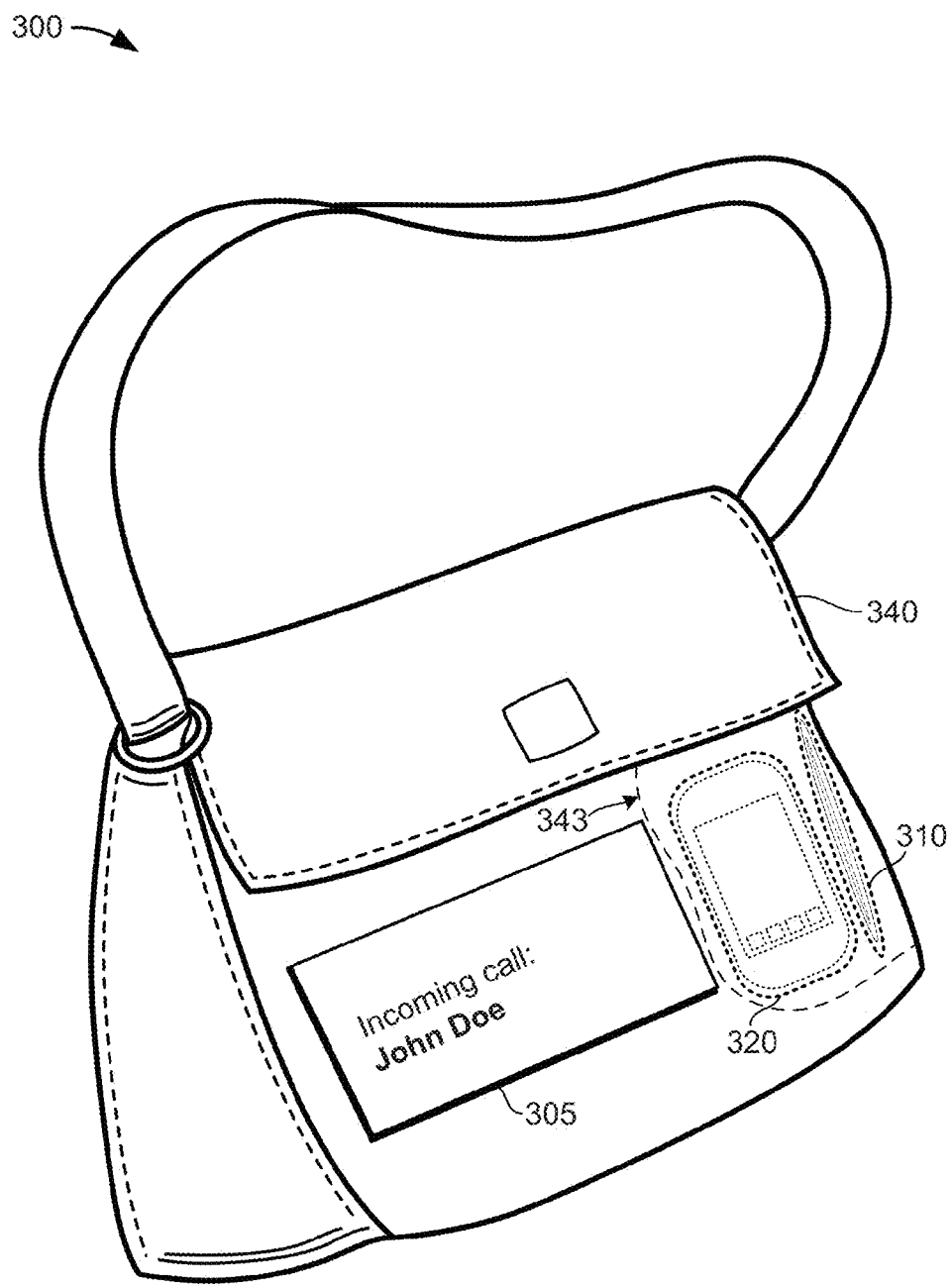
FIG. 3 is a three-dimensional illustration of the accessory display system implemented within a carrying bag according to an example of the present invention.

FIG. 3 is a three-dimensional illustration of the accessory display system implemented within carrying bag according to an example of the present invention. Here, a phone or mobile device 320 and a receiver 310 are placed within a carrying bag 340. In one example, the mobile device 320 is held loosely in a pocket or compartment 343 on the inside of the purse 340 and in close proximity to receiver 310 such that an electrical transformer is formed between the two devices 310 and 320 by virtue of the generated electromagnetic field as discussed above. Moreover, an external display 305 is positioned on an outer area of the carrying bag 340 via an adhesive or direct integration and receives power and data from the receiver 310 for presenting information to the user. When a user visits a public place such as a restaurant for example, the accompanying carrying bag or purse 340 may rest on a chair or table in full view of the user. However, if the mobile device 320 is placed within the purse 340, then the phone 320 is likely not in plain view of the user. According to configuration of the accessory display system, the user would still be able to view alerts via the external display 340 positioned on the outer area of the purse or carrying bag 340. Additionally, the external display 340 may be used for decorative purposes by displaying artwork or photos from the mobile device 320. When the phone is removed from the purse 340, the external display 305 automatically turns off and the purse 340 returns to its normal state without the necessity to protect it from the harmful elements or to charge a battery within the carrying bag 340.

Figure 4:
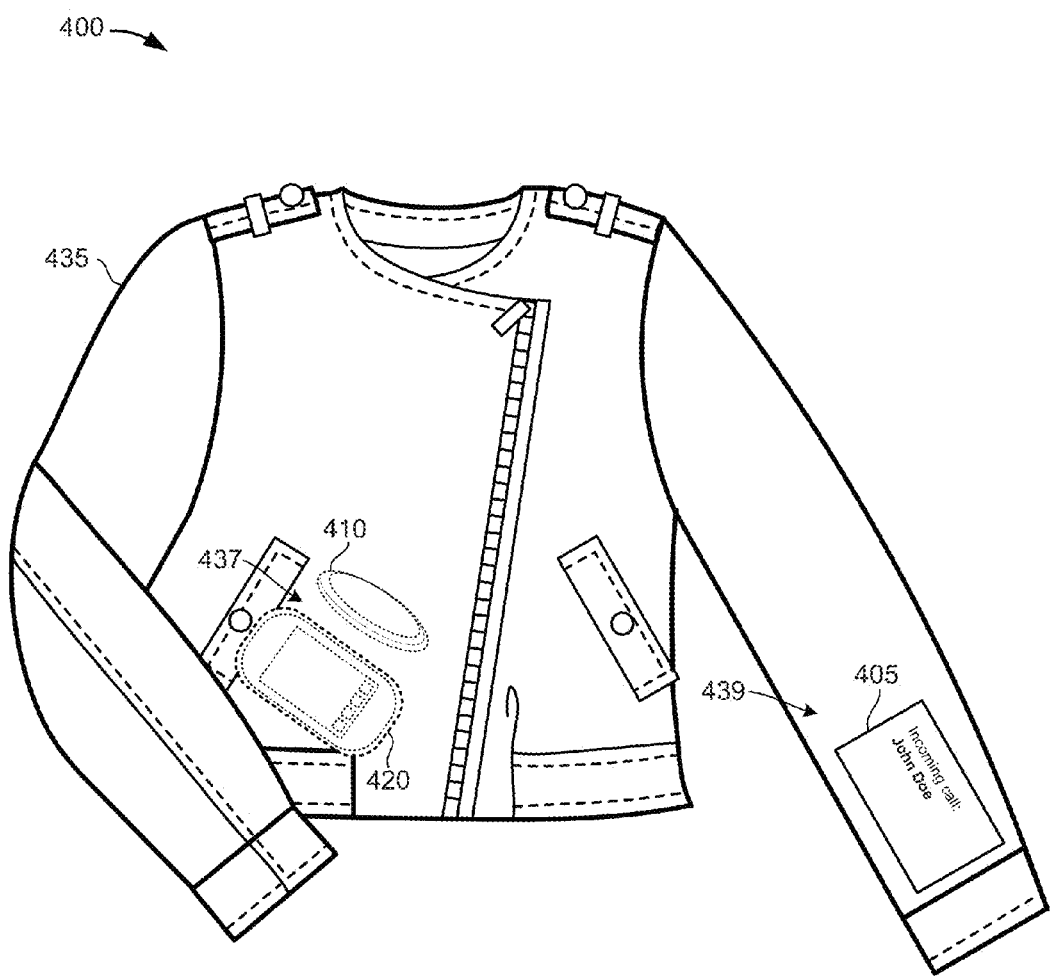
FIG. 4 is a three-dimensional illustration of the accessory display system implemented within a garment according to an example of the present invention.

FIG. 4 is a three-dimensional illustration of the accessory display system implemented within a garment according to an example of the present invention. As shown here, a phone or mobile device 420 and a receiver 410 are placed within a user's coat or jacket 435. According to one example embodiment, the mobile device 420 lies within an inner area 437 of the jacket 435 in close proximity to receiver 410 such that an electrical transformer is formed and power/data may be wirelessly transferred between the two devices 410 and 420. More specifically, when the mobile device 420 is placed within the jacket pocket 437, the mobile device 420 is configured to automatically send power and data to the receiver unit 410, which may be positioned within or proximate to the jacket pocket 437. In addition, external display 405 is positioned on an outer area 439 of the jacket 435 and receives power and data from the receiver 410 for presenting information to the user. The external display 405 may be formed anywhere on an outer area 439 of the jacket 340. In the present example, the external display is formed near the wrist area of the jacket 340 so as to provide the most convenient viewing position for the operating user. Accordingly, the user's garment 435 is provided with an integrated wristwatch-type display that is able to display not only the time, but weather, stocks, and incoming messages from an associated mobile device 420.

Figure 5:
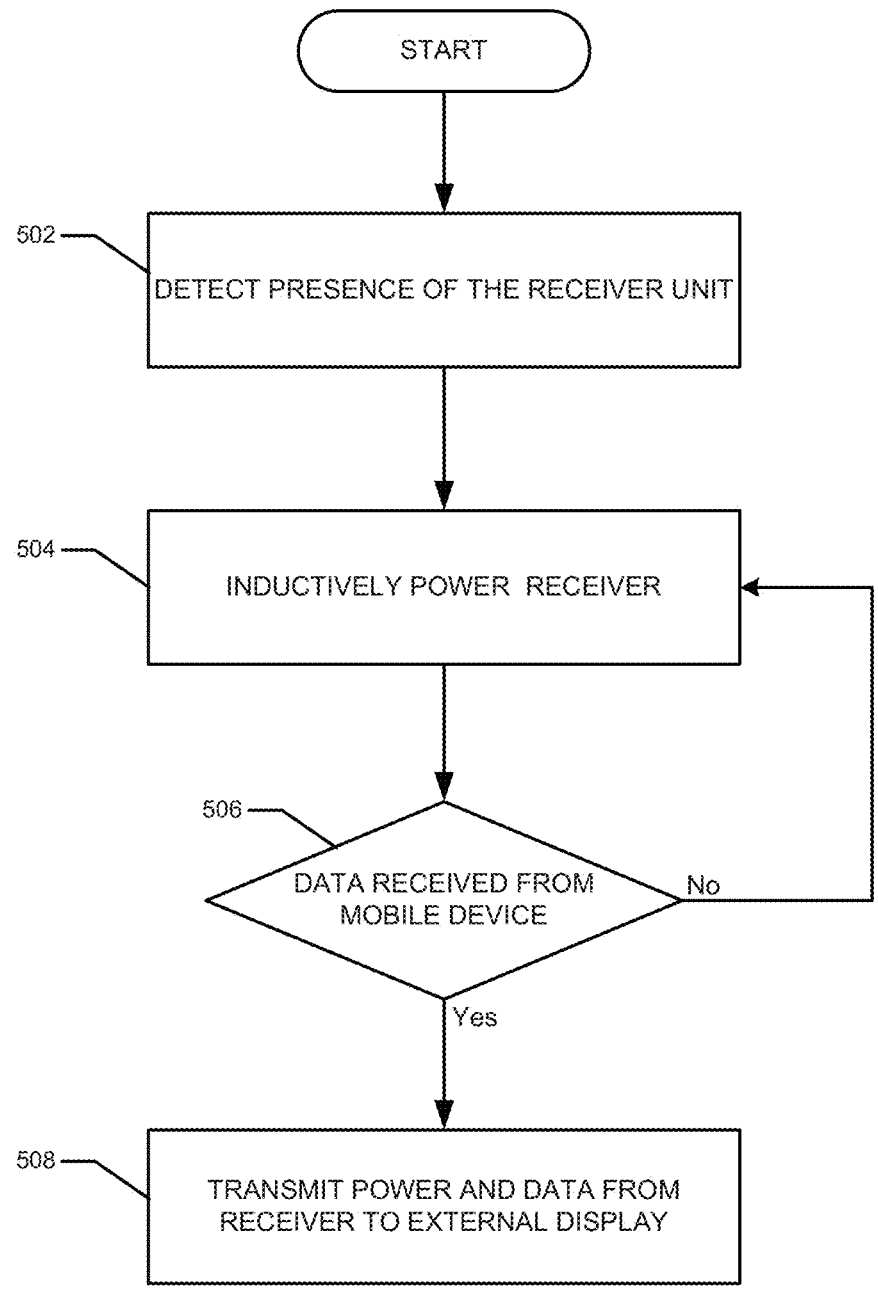
FIG. 5 is a simplified flow chart of the processing steps for the accessory display system according to an example of the present invention.

FIG. 5 is a simplified flow chart of the processing steps for the accessory display system according to an example of the present invention. In step 502, the processing unit of the mobile device detects the presence of the receiver unit within a power exchange proximity (i.e., sufficient distance for wireless energy transfer). For example, when the user places their phone in a pocket or carrying bag containing the receiver unit, the processing unit may detect the power source resonator (e.g., primary inductive coil) creating a magnetic field with the power capture resonator (e.g., secondary inductive coil) of the receiver unit. Then, in step 504, the receiver unit is inductively powered by the mobile device through the electrical transformer formed between the two inductive coils. If data is received from the mobile device in step 506, then power along with the received data is transferred from the receiver unit to the external display in step 508.

Many advantages are afforded by the accessory display system according to examples of the present invention. For instance, direct integration of the external display into the object holding the mobile device allows the mobile device to power the external display and transmit data thereto more efficiently. When the phone is placed within a garment or carrying bag as described above, the accessory display system is configured to power the external display whenever a new message arrived, thereby providing a separate and remote visual representation of the message without the need for the user to extract the phone from its confines (e.g., jacket pocket or purse). Moreover, the external display could also show status information such as time, weather, stock quotes, or any other type of desired information that is continually updated throughout a given day. Still further, since the carrying bag or garment is powerless and does not need to be charged, it can be made to be shock and water resistant while also permitting the accessory display system to be implemented into existing garments and carrying bags.

Furthermore, while the invention has been described with respect to exemplary embodiments, one skilled in the art will recognize that numerous modifications are possible. For example, although example embodiments depict a smartphone as the representative mobile device, the invention is not limited thereto. For example, the mobile device may be a netbook, a tablet personal computer, a cell phone, or any other portable electronic device configured to display information to a user and capable of short range wireless energy transfer.

Furthermore, the accessory display system may operate with the receiver unit in which case the mobile device transmits power and data directly to the external display. In such a case, the external display may include a wireless power capturing mechanism. Also, the receiver unit and external display of the accessory display system may be fully integrated as part of the garment or carrying bag. Thus, although the invention has been described with respect to exemplary embodiments, it will be appreciated that the invention is intended to cover all modifications and equivalents within the scope of the following claims.

What is claimed is:

1. A system comprising: an accessory display; a portable electronic device configured to power and transmit data to the accessory display for remote viewing by an operating; and a receiver unit configured to communicate with the portable electronic device, wherein the data from the portable electronic device is transmitted to the accessory display via the receiver unit and wherein the power is transferred inductively by the portable electronic device to the receiver unit and relayed to the accessory display.

2. The system of claim 1, wherein the power from the portable electronic device is transmitted wirelessly to the accessory display.

3. The system of claim 1, wherein the portable electronic device includes a power source resonator and the receiver unit includes a power capture resonator.

4. The system of claim 3, wherein when the portable electronic device is placed within a power exchange proximity to the receiver unit, power is transferred wirelessly from the mobile device to the receiver unit.

5. The system of claim 3, wherein the receiver unit is configured to transfer power and data received from the portable electronic device to the accessory display.

6. The system of claim 5, wherein the power and data from the receiver unit is transmitted through a direct electrical connection with the accessory display.

7. The system of claim 1, further comprising:
an input mechanism positioned proximate to the accessory display for providing feedback to the portable electronic device.

8. The system of claim 1, wherein the accessory display is a bi-stable or flexible display.

9. The system of claim 1, wherein the accessory display is affixed to or integrated with a garment worn by the operating user.

10. The system of claim 1, wherein the accessory display is affixed to or integrated with an outer area of a carrying bag that the portable electronic device is placed within.

11. The accessory display system of claim 1, wherein the external display is affixed to or integrated with a garment worn by the operating user or an outer area of a carrying bag.

12. An accessory display system comprising: an external display configured to display information or remote viewing by an operating user; and a mobile device configured to transfer power and transmit data wirelessly to a receiver unit;
wherein the data from the portable electronic device is transmitted to the accessory display via the receiver unit; and wherein the power is transferred inductively by the portable electronic device to the receiver unit and relayed to the accessory display.

13. The accessory display system of claim 12, further comprising:
an input mechanism positioned proximate to the external display for providing feedback to the mobile device.

14. The accessory display system of claim 12, wherein the mobile device includes a power source resonator and the receiver unit includes a power capture resonator.

15. The accessory display system of claim 14, wherein when the mobile device is placed within a power exchange proximity to the receiver unit, power is transferred inductively from the mobile device to the receiver unit.

16. The accessory display system of claim 15, wherein the receiver unit is configured to transfer power and data received from the mobile device to the external display.

17. The accessory display system of claim 16, wherein the power and data is transmitted through a direct electrical connection between the receiver unit and the external display.

18. A method for providing an accessory display system, the method comprising: detecting the presence of a receiver unit within a power exchange proximity to a mobile device; transferring power inductively from the mobile device to the receiver unit and relayed to the accessory display; and transmitting the data associated with the mobile device to an external display for remote viewing by an operating user.

19. The method of claim 18, wherein the power and data is automatically transferred to the external display when a new message is received at the mobile device.

* * * * *